UNITED STATES PATENT OFFICE.

LENA ROUDEN, OF LOUISVILLE, KENTUCKY.

MEDICINAL TONIC.

SPECIFICATION forming part of Letters Patent No. 254,384, dated February 28, 1882.

Application filed June 16, 1881. (No specimens.)

*To all whom it may concern:*

Be it known that I, LENA ROUDEN, of Louisville, Kentucky, have invented a new and useful Medical Tonic, of which the following is a clear, full, and exact description.

The object of my invention is to furnish an efficient and pleasant tonic for all cases of general debility; and it consists in medical compound, as hereinafter described and claimed.

To enable others to make and compound my tonic, I will proceed to describe the exact manner in which I make it.

To one quart of wine or any kind of spirituous liquor (sherry wine being preferable) I add one tea-cupful of a strong tea made from wahoo bark, one-third of a tea-cupful of a strong tea made from valerian, and one-third, or nearly so, of a tea cupful of a strong tea made from the golden seal. The mixture thus made is allowed to stand twenty-four hours, and it is then ready for use. The dose is a half wine-glassful, more or less, three times a day. In making the teas I use about two ounces of the ingredient to a pint of water.

Having thus explained my invention, what I claim as new, and desire to secure by Letters Patent, is—

The compound or tonic herein described, and consisting of wine or spirituous liquor, wahoo bark, valerian, and golden seal, substantially in the proportions named.

LENA ROUDEN.

Witnesses:
H. N. ROACH,
T. WALTER FOWLER.